Patented Mar. 23, 1943

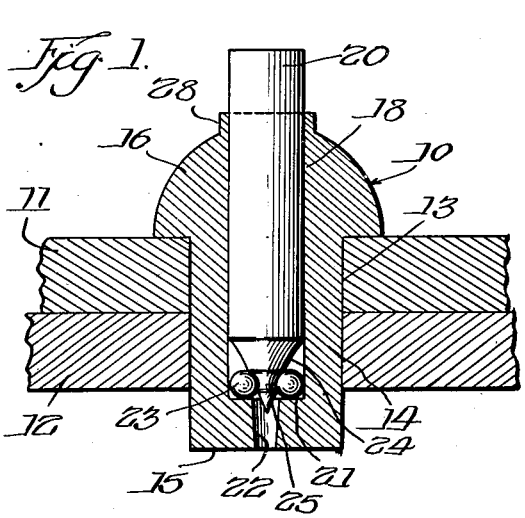
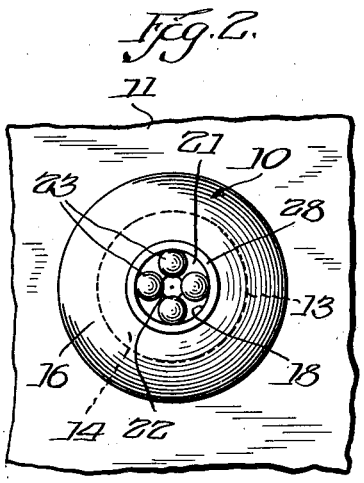
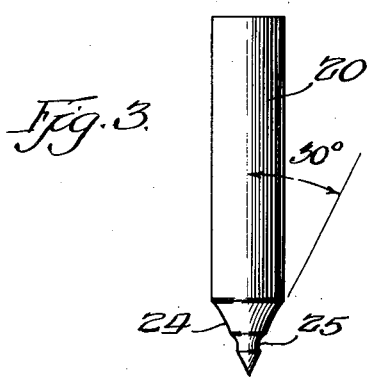
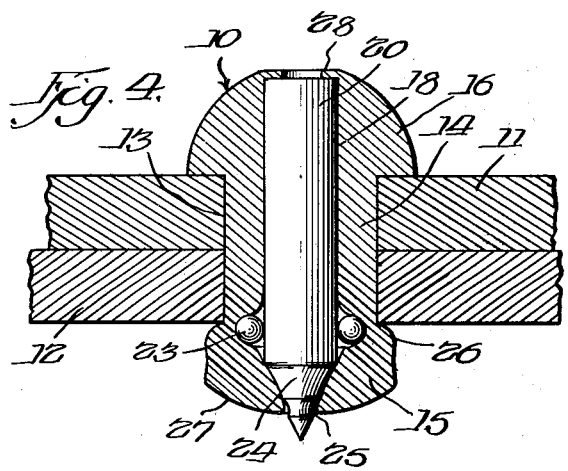
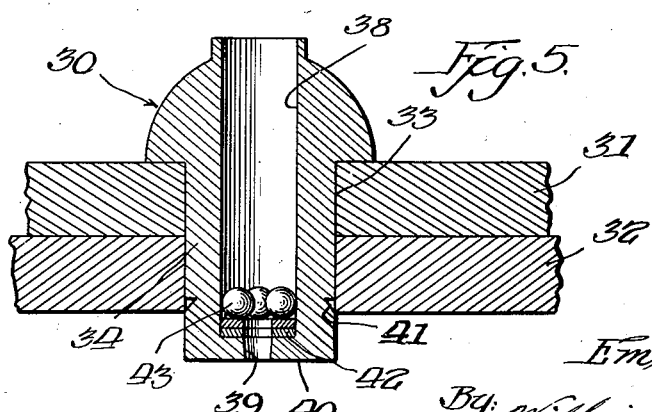

2,314,445

UNITED STATES PATENT OFFICE 2,314,445

EXPANDING RIVET

Emile M. Du Vall, Chicago, Ill., assignor to Robert E. Owens, Chicago, Ill.

Application June 26, 1941, Serial No. 399,789

7 Claims. (Cl. 85—40)

The invention relates to a rivet construction of the self-heading type having a pin to be driven into the rivet for the purpose of expanding the inserted end.

The present rivet can be inserted in the work and expanded by a single workman with all operations being performed from one side. Since it is possible to produce a clinching head on the rivet without the necessity of backing the same, the construction of the invention finds unlimited application in manufacturing operations such as the riveting of airplanes, railway cars, trains and tanks. Therefore an object of the invention is to provide a self-heading rivet which will be particularly adapted for difficult operations where it is impossible to back the rivet and where all operations must be carried on from the side at which the rivet is applied.

Another object is to provide a rivet of novel construction which will embody a pin to be driven through the rivet for expanding the same and wherein said expansion will be effected by said pin through the instrumentality of hardened steel ball bearings.

Another object is to provide a rivet construction having an insertable pin for moving a plurality of hardened steel balls in a lateral direction into the body of the rivet whereby the shank is expanded adjacent the end of the same to securely anchor the rivet in place.

Another object is to provide a rivet construction of the character described having an insertable pin for expanding the rivet through the instrumentality of hardened ball bearings and wherein said balls concentrate the expansion at the desired place and also effectively prevent withdrawal of the pin.

With these and various other objects in view, the invention may consist of certain novel features of construction and operation, as will be more fully described and particularly pointed out in the specification, drawing and claims appended hereto.

In the drawing which illustrates an embodiment of the device and wherein like reference characters are used to designate like parts—

Figure 1 is a vertical sectional view through a rivet embodying the features of the present invention and showing the pin in retracted position prior to being driven into the rivet for expanding the same;

Figure 2 is a top plan view showing the rivet of Figure 1 with the pin withdrawn to illustrate the positioning of the hardened steel balls;

Figure 3 is an elevational view of the pin;

Figure 4 is a vertical sectional view showing the rivet of Figure 1 with the shank expanded to clinch the rivet in place by driving the pin into the rivet to its full extent; and Figure 5 is a vertical sectional view showing a modified form of rivet embodying the basic principles of the present invention.

Referring to the drawing, particularly Figure 1, the rivet of the invention indicated generally by numeral 10 is shown in associated relation with a pair of plates 11 and 12 to be riveted. Said plates are provided with aligned openings 13 and the shank 14 of the rivet is inserted through said openings with the end portion 15 depending below the undersurface of plate 12. In accordance with the invention the said end portion 15 can be expanded against the wall of the rivet opening and in a manner to produce a flaring end with respect thereto in order to securely rivet the plates 11 and 12 in overlapping relation. The present rivet is constructed so that said expansion can be accomplished with all operations being performed from the side from which the rivet is applied.

The rivet 10 is provided with a conventional head 16 which overlaps the opening 13 so as to rest on plate 11. The cylindrical portion 14 integral with the head 16 has a length so that a portion depends below the rivet opening as previously explained. The rivet is provided with a bore 18 extending therethrough and which for the greater part of its length has a diameter to accommodate the hardened steel drive pin 20. This constitutes the large diameter of the bore and the same extends to the shoulder 21 in the end portion 15. From the shoulder the bore 22 is substantially reduced in diameter so as to retain the hardened steel ball bearings 23 in place on said shoulder. It will be observed that the steel balls have a diameter greater than that of bore 22 and therefore upon insertion of the balls within the bore 18 they come to rest on the shoulder 21 and said balls do not pass on through the rivet. As shown in Figure 3, the pin 20 is tapered at 24 and said tapering portion is formed with a peripheral detent 25 adapted to contact the hardened steel balls 23 with a slight pressure and therefore maintain the parts in place to form a unitary assembly, in which condition the rivet can be sold as an article of manufacture. The pin 20 has a relatively tight driving fit with the bore 18 and this also helps to maintain the parts in assembled relation.

An important feature of the invention is concerned with the special taper given to the end 24 of the pin so as to produce radial movement outwardly of the hardened steel balls 23 when the drive pin is driven into the rivet for expanding the end portion 15. As shown in Figure 3, the taper substantially approximates thirty degrees from the vertical. This disclosure is not to be taken as limiting since the angle of taper can be varied somewhat but it is necessary to have this end of the pin pointed in such a manner that downward movement of the pin will act to force the hardened steel balls 23 laterally outward into the walls of the rivet. If the taper is too blunt the downward movement of the pin will force the balls downwardly instead of laterally outward and an ineffective expanded end will result. It will be observed with reference to Figure 1 that the shoulder 21 at the base of said bore 18 is located on approximately the same horizontal plane as the undersurface of lower plate 12. The shoulder therefore is instrumental in locating the balls and as the same are forced outwardly from this location the greatest possible expansion is produced in a horizontal plane substantially coinciding with said shoulder. The expansion is desired at these points since the greatest amount of metal is caused to protrude beyond the edges of the opening 13 in plate 12. The rivet with the end portion 15 fully expanded is shown in Figure 4. The hardened steel balls 23 have concentrated the maximum stress on a plane substantially coinciding with the undersurface of plate 12 and as a result the expanded portions 26 are effective to securely clinch the rivet and hold the plates 11 and 12 in connected relation.

For expanding the said end portion it is only necessary to drive pin 20 its full distance into rivet 10. Movement of the pin downwardly will first of all drive the hardened steel balls in a radial direction outward as explained and simultaneously therewith the tapered end 24 will enter bore 22 and cause expansion of said bore as a result of continued downward movement of the pin. This expansion of bore 22 has the effect of forming a bulbous portion at the extremity of the shank 14 of the rivet such as portion 27 and which is expanded to even a greater extent than the portion 26. The steel balls 23 have the effect of controlling and directing the expansion. The balls in moving outwardly compact the metal between the same and the walls of the rivet opening 13. The excess is caused to bulge and form the expanded portions 26.

Since the pin 20 has a driving fit with the rivet it will be clearly understood that the pin will remain in the position it assumes in Figure 4 although the rivets and plates carrying the same are subjected to intense vibration. The pin is partly retained in position by its driving fit within bore 18 and also by the hardened balls 23 which apply considerable pressure thereto to prevent any retraction of the pin. However, it may be desirable to bend over the flanges 28, in which case the pin 20 can be considered as locked in place.

In Figure 5 the rivet 30, having a cylindrical shank 34, is inserted in aligned openings 33 provided therefor, formed in the overlapping plates 31 and 32. The rivet is adapted to receive a pin such as 20 for which purpose the rivet is formed with a bore 38 extending for the greater portion of the length of the rivet and terminating in a bore 39 of smaller diameter. In this modification of the invention the end portion 40 is provided with a groove 41 extending around the periphery of the shank of the rivet. The bottom of bore 38 is provided with one or more washers 42 which are used so as to properly position the hardened steel balls 43 which rest on the said washers. In expanding the modified form of rivet shown in Figure 5 the operation is substantially the same as that described with respect to Figures 1 and 4. A hardened steel pin such as 20 is adapted to be inserted within bore 38 and which pin will have a driving fit therewith. When the pin has been driven into the rivet to its full extent the hardened steel balls 43 will be driven laterally outward and to a slight extent downwardly so as to form an expanded portion immediately below the undersurface of plate 32. In this form of the invention the groove 41 materially increases the expansion properties of the rivet portion 40 so that full expansion of said depending shank may take place without splitting. The hardened steel balls 43 will be driven radially outward to assume a position substantially as shown in Figure 4, whereas, the washers 42 will be mutilated to a considerable extent and said washers will be driven downwardly to help in expanding and forming the bulbous portion on the depending end of the shank. The score mark or groove 41 provides for displacement of the metal upwardly during expansion, tending to fill the groove. The washers 42 are also of fairly hard metal such as steel so as to reinforce the bottom of bore 38 which in effect provides the shoulder for supporting the steel balls. As a result of the washers the steel balls are forced radially outward by the driving pin so as to expand the portion 40, whereas, without the washers the balls 43 might have a tendency to travel downwardly.

The location of the shoulder in the present rivet is very important since it will be clearly understood from the foregoing that the shoulder locates the balls comprising the expansion members. The shoulder may be formed directly by the base of the bore as shown in Figure 1 or said shoulder may be formed by washers as in Figure 5. Whatever may be the particular location of this shoulder it will be clearly understood that the expansion means in the form of any relatively hard members such as the balls shown and described will be forced laterally outward from said position into the metal of the rivet to cause expansion at this point. Although the ball bearings are shown in the drawing as the preferred expansion means the invention is not limited to these members as any relatively hard objects may be used which will react with the driving end of the pin to travel outwardly, thereby compressing the cylindrical wall of the rivet at such points to cause expansion and securement of the rivet within its opening.

The invention is not to be limited to or by details of construction of the particular embodiment thereof illustrated by the drawing, as various forms of the device will of course be apparent to those skilled in the art without departing from the spirit of the invention or the scope of the claims.

What is claimed is:

1. In a device of the character described, a rivet having a bore extending through the head thereof into the shank of the rivet, said bore terminating in a base providing a shoulder substantially normal to the cylindrical walls of the bore, a plurality of relatively hard surfaced balls within said bore supported by and in contact with said shoulder, a pin having a tapered end for insertion in said bore for coaction by said tapered end with said balls to expand the rivet in the vicinity thereof, and said shank having a second bore therein of a diameter to receive the pointed end of the pin and extending from said shoulder in a direction toward the end of the rivet opposite the bore.

2. An expansion rivet for insertion in an opening in parts to be joined thereby, including a head having a cylindrical portion extending therefrom, said rivet having a bore extending through the head into the cylindrical portion, a shoulder at the base of the bore substantially normal to the walls of the bore, a plurality of relatively hard surfaced balls within said bore and supported by said shoulder, a pin for insertion into said bore having a driving fit therewith, said pin having the inserted end thereof tapered and shaped to coact with the balls to force them laterally outward into the walls of the cylindrical portion to expand the same in the vicinity of the balls, and the shoulder forming the base of said bore having a second bore extending therefrom toward the end of the cylindrical portion opposite the head, said second mentioned bore having a diameter to receive the pointed end of the pin.

3. An expansion rivet for insertion in an opening in parts to be joined thereby, including a head having a cylindrical portion extending therefrom, said rivet having a bore extending through the head into the cylindrical portion, a shoulder at the base of the bore substantially normal to the walls of the bore, a plurality of relatively hard surfaced balls within said bore and supported by said shoulder, a pin for insertion into said bore having a driving fit therewith, said pin having the inserted end thereof tapered to coact with the balls to force them laterally outward into the walls of the cylindrical portion to expand the same in the vicinity of the balls, and the shoulder forming the base of said bore having a second bore extending therefrom toward the end of the cylindrical portion opposite the head, said second mentioned bore having a diameter smaller than the balls to prevent access of the balls thereto.

4. An expansion rivet for insertion in an opening in parts to be joined thereby, including a head of larger diameter than the opening and having a cylindrical portion depending therefrom to fit within said opening, said rivet having a bore extending through the head into the cylindrical portion, at least one washer within said bore in supported relation with the base thereof to form a shoulder substantially normal to the walls of the bore, a plurality of relatively hard surfaced balls within said bore in contact with said washer, a pin for insertion into said bore having a driving fit therewith, said pin having the inserted end thereof tapered to coact with the balls to force them laterally outward into the walls of the cylindrical portion to expand the same in the vicinity of the balls, and said washer having a central opening of smaller diameter than the balls to prevent the balls from passing therethrough.

5. An expansion rivet for insertion in an opening in parts to be joined thereby, including a head of larger diameter than the opening and having a cylindrical portion depending therefrom to fit within said opening, said rivet having a bore extending through the head into the cylindrical portion, the base of said bore providing a shoulder substantially normal to the walls of the bore and located in a plane below the undersurface of the parts to be joined, a plurality of ball bearings within said bore supported by and in contact with said shoulder, a pin for insertion into said bore having a driving fit therewith, said pin having the inserted end thereof tapered to coact with the balls to force them laterally outward into the walls of the cylindrical portion to expand the same in the vicinity of the balls, and the shoulder forming the base of said bore having a second bore extending therefrom toward the end of the cylindrical portion opposite the head, said second mentioned bore having a diameter smaller than the first mentioned bore and being adapted to receive the pointed end of the pin.

6. An expansion rivet for insertion in an opening in parts to be joined thereby, including a head having a cylindrical portion extending therefrom, said rivet having a bore extending through the head into the cylindrical portion and terminating in a base providing a shoulder, a plurality of relatively hard surfaced members within the bore and supported by said shoulder, a pin having a tapered end for insertion in said bore, said tapered end coacting with the members upon complete insertion of the pin to force the members outwardly in a substantially lateral direction into the cylindrical walls of the shank, thereby expanding the same in the vicinity of the base, and means facilitating said expansion including a second bore of smaller diameter than the first mentioned bore and extending from the base to the end of the rivet opposite the head, said pointed end of the pin being adapted to enter the second bore and said second bore having sufficient diameter and being located centrally to receive the said pointed end.

7. An expansion rivet for insertion in an opening in parts to be joined thereby, including a head of larger diameter than the opening and having a cylindrical portion depending therefrom to fit within said opening, said rivet having a bore extending through the head into the cylindrical portion and terminating in a base providing a shoulder substantially normal to the walls of the bore, said shoulder being located in a plane beyond the undersurface of the parts to be joined when the cylindrical portion of the rivet has location within the opening, a plurality of expansion members within the bore and supported by said shoulder, a pin for insertion in said bore having a driving fit therewith, said pin having the inserted end thereof tapered to coact with the members to force them laterally outward into the walls of the cylindrical portion to expand the same in the vicinity of the base, the shoulder forming the base of said bore having a second bore extending therefrom to the end of the cylindrical portion opposite the head, said second mentioned bore having a diameter smaller than the first mentioned bore, and said pointed end of the pin being adapted to enter the second bore and upon complete insertion thereof causing expansion of the walls of said second bore and likewise said end of the rivet.

EMILE M. DU VALL.